United States Patent Office 2,864,136
Patented Dec. 16, 1958

2,864,136

COMBINATION LATERAL AND VERTICAL PRESSURE DIAPHRAGM MOLDING MACHINE

Russell W. Taccone, Erie, Pa., assignor to Taccone Pneumatic Foundry Equipment Corporation, North East Township, Pa., a corporation of Pennsylvania Application September 19, 1955, Serial No. 534,975

2 Claims. (Cl. 22—42)

This invention relates to molding machines and more particularly to the type of molding machines utilizing a flexible diaphragm.

This application constitutes an improvement of Patent No. 2,715,758, issued August 23, 1955.

In certain types of molding operations utilizing diaphragms for compressing the molding material, the molding material directly over the pattern is compressed to a higher density than the molding material at the sides and adjacent edges of the flask. In some casting processes, it is desirable to have the sides of the molding material packed harder than the center of the mold.

It is, accordingly, an object of this invention to provide a diaphragm operated molding machine wherein the molding material on all parts of the flask will be packed at substantially equal density.

Another object of the invention is to provide a diaphragm operated molding machine wherein a diaphragm operates to pack the sand or molding material downward on top of the pattern and other diaphragms are provided for packing the sand or molding material inwardly from each side of the pattern.

Another object of the invention is to provide a molding machine having a car carrying a pattern plate and a stripping mechanism to strip the mold off the pattern plate, all built into the car.

A further object of the invention is to provide a diaphragm operated molding machine which is simple in construction, economical in manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 4 is a broken away view of the car and stripping mechanism for the molding machine with the mold lifted off the pattern.

Figure 1:
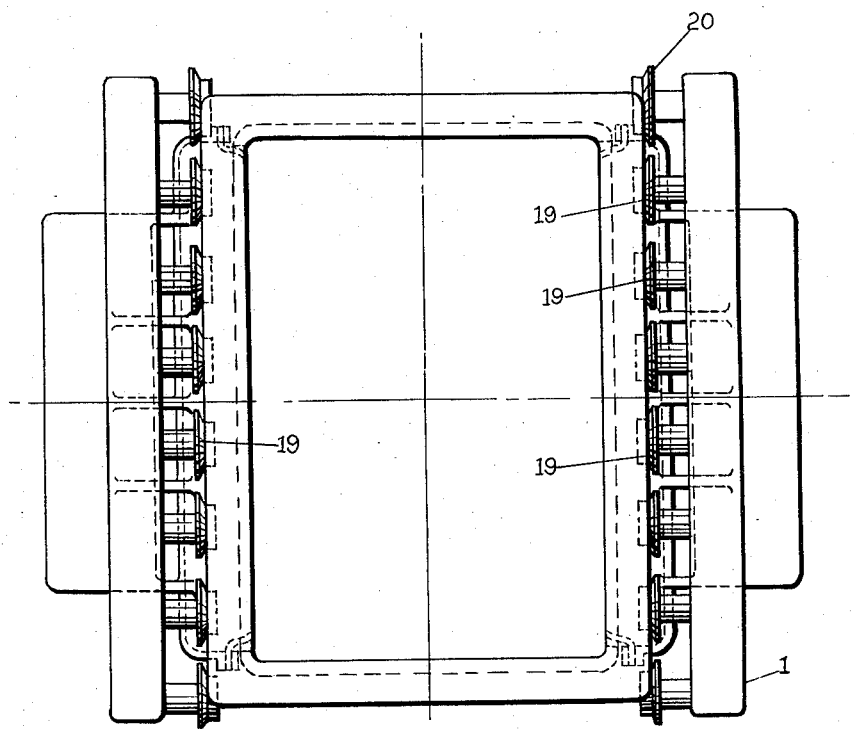
Fig. 1 is a plan view of the molding machine according to the invention.

Now with more specific reference to the drawings, a molding machine 1 is shown. The machine 1 has a base 2 with column members 3 which are fixed to brackets 4 in the base 2. A head 5 is held onto the column members 3 by means of nuts 6 threadably disposed on the columns 3 above the head 5. Nuts 7 support the head 5 from below. The nuts 7 are threadably disposed on the columns 3 below the head 5. The columns 3 are held in rigid relationship on the bracket members 4 by means of nuts 8 threadably disposed on the lower end of the columns 3.

A flexible diaphragm 10 which is made of sheet like material is attached to the peripheral surface of the head 5 at 11 in the manner disclosed in the said prior patent and a vacuum producing means is provided to produce a vacuum in a cavity 12 between the diaphragm 10 and the inside surface of the head 5. Means is provided to alternately apply a pressure in the cavity 12 above the diaphragm 10 to force the diaphragm 10 to pack sand in the mold onto the pattern plate 25.

A flask 23 is supported by means of a stripping mechanism which is integral with the car and adapted to strip the flask 23 and lift the mold off the pattern. The stripping and supporting mechanism is made up of upstanding brackets 14 which are integrally attached to the base 2 at 15 and telescopically support shafts 16 which have axles 17 attached to the upper ends thereof by means of attaching members 18. The axle members 17 carry wheels 19 which have flanges 20 extending outwardly from one side of the outer periphery thereof. The wheels 19 are disposed in spaced aligned relation and are adapted to support an upper flange 22 of the flask 23 so that the flask can be moved lateraly off of the pattern plate 25 on the wheels 19 to a position to be disposed in a casting operation when lifted therefrom. The flask 23 is lifted by pistons 75 moving in cylinders 76 and 77 which have a piston rod 78 attached thereto. When the piston rod 78 moves from left to right, the racks 79 attached thereto rotate gears 70 which engage a rack 80 on the shafts 16 to lift the flask 23 off of the pattern plate 25 to the position shown in Fig. 4.

Figure 2:
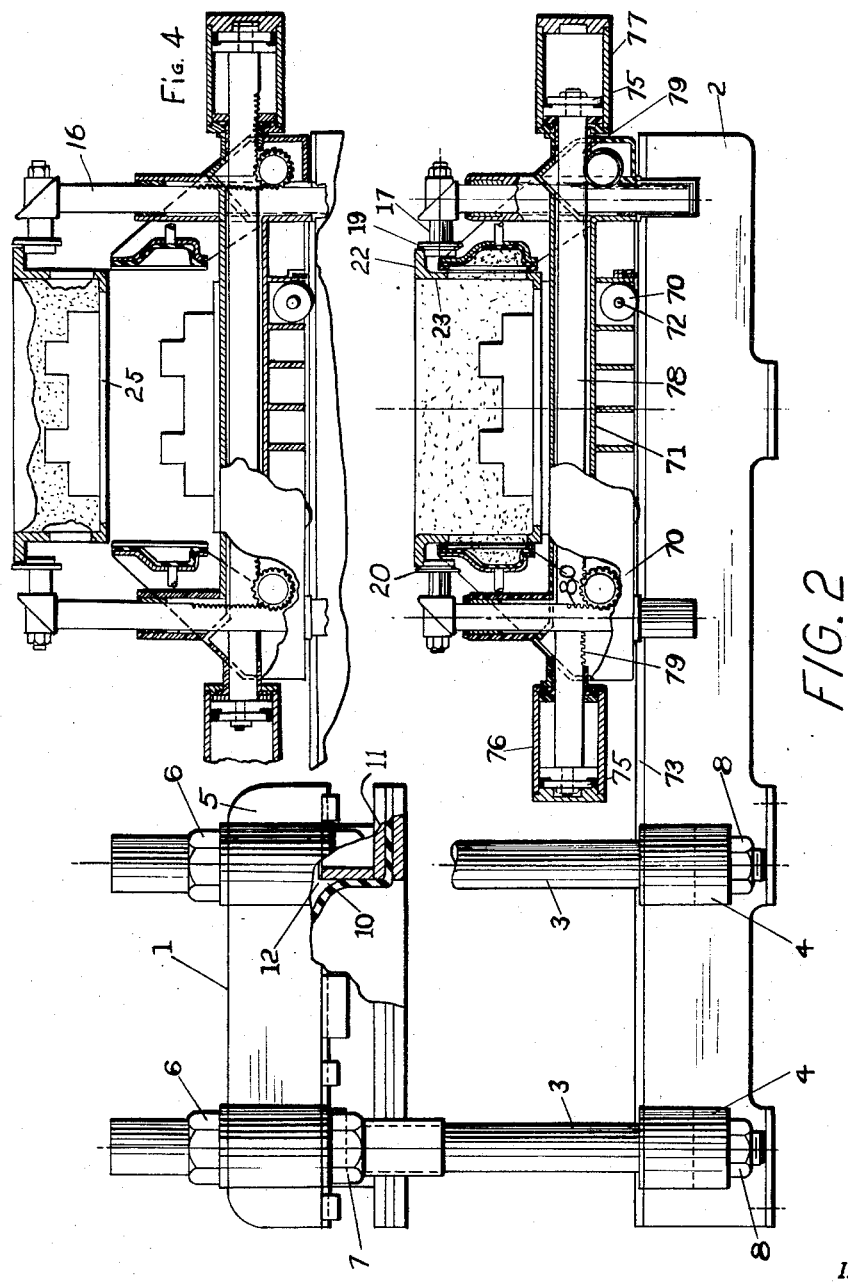
Fig. 2 is a side view partly in cross section of the molding machine shown in Fig. 1.
Figure 3:
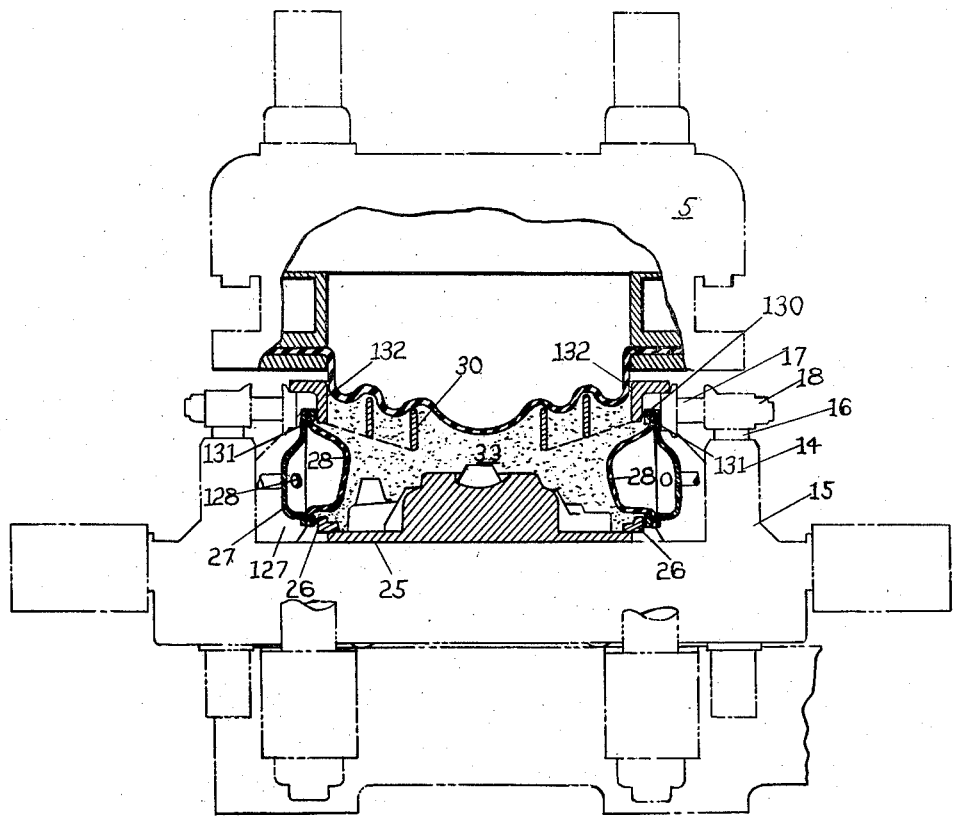
Fig. 3 is an end view partly in cross section of the molding machine.

The flask 23 has lateral openings 26 formed on either side thereof and supported on the base 2 is the concave member 27. The member 27 is attached to the machine frame by means of a bracket 127 and has air under pressure and vacuum selectively applied thereto through opening 128. The concave member 27 forms a cavity and is adapted to receive the side diaphragm 28 when a vacuum is applied in the cavity behind the diaphragm 28. The side diaphragm 28 pulls into the cavity out of the main body portion of the flask 23 into the position shown in Fig. 2. The flask 23 will be lowered to a position between the two concave head members 27, leaving a clearance at 130 between the upper edge member 131 and the edge 132 of the flask 23. This clearance can have a maximum value of twice the thickness of the diaphragm 28 and still maintain a seal since the diaphragm 28 will bridge the opening and prevent it ballooning out therethrough when pressure is applied between the diaphragm 28 and the head 27. Support members 30 in the form of plates are disposed across the upper side of the flask 23 and inclined downwardly toward the center thereof.

During molding operation, the flask 23 is set with its flanges 22 resting on the wheels 19. The flask 23 is then pushed laterally on the wheels 19 until it comes into alignment with the pattern plate 25. The pistons 75 are then actuated to lower the flask 23 onto the pattern 25 and between the lateral heads 27 to the position shown in Figs. 1 and 2. The flask 23 is then filled with molding material and moved under the head 5. Before moving the flask 23 under the head 5, the cavity 12 has a blower or other suction means to apply a vacuum thereto through a pipe connected to the opening 128 to hold the diaphragm 28 up in the heads 27. A similar vacuum means applies vacuum to the cavity 12 between the diaphragm 10 and the head 5 to hold the diaphragm 10 up in the head 5. Then the vacuum is relieved and a pressure is applied in the cavity 12 to force the diaphragm 10 into molding engagement with the molding material or sand 33. Simultaneously, a pressure is applied inside the lateral head 27 behind the diaphragm 28, thereby forcing the flange 22 laterally into engagement with the pattern 25. Therefore, it will be seen that pressure is applied to the sand around the pattern 25 from two directions; that is, vertically and laterally. Therefore, the sand is uniformly packed around the pattern 25.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a base adapted to support a pattern plate with a pattern thereon, means to support a flask around said pattern, spaced concave members disposed on said support having flexible diaphrams attached to the periphery of their concave surfaces whereby a chamber is provided between said concave surface and said diaphragm, said flask being adapted to be disposed over said pattern plate and between said concave members, openings in said flask walls adapted to be disposed in alignment with said diaphragms whereby pressure in the cavity behind said diaphragm is adapted to force said diaphragm into packing engagement with molding material adapted to be disposed in said flask over said pattern, and means to apply pressure to the top of said molding material.

2. The molding machine recited in claim 1 wherein rib members are transversely disposed across said flask whereby said molding material, when molded, is reinforced.

References Cited in the file of this patent
UNITED STATES PATENTS

| | | |
|---|---|---|
| 989,578 | Deville | Apr. 18, 1911 |
| 1,343,386 | Bomberg | June 15, 1920 |
| 1,883,542 | Campbell | Oct. 18, 1932 |
| 2,019,937 | Staples | Nov. 5, 1935 |
| 2,326,381 | Milligan et al. | Aug. 10, 1943 |
| 2,350,971 | Pecker et al. | June 6, 1944 |
| 2,360,528 | Talmage | Oct. 17, 1944 |
| 2,698,976 | Taccone | Jan. 11, 1955 |

FOREIGN PATENTS

| | | |
|---|---|---|
| 2,801 | Great Britain | Dec. 5, 1912 |
| 535,906 | Germany | Oct. 16, 1931 |
| 810,058 | Germany | Aug. 6, 1951 |